FREQUENCY DISCRIMINATOR WITH INJECTION-LOCKED OSCILLATOR

Filed Dec. 22, 1966

INVENTOR
C. L. RUTHROFF
BY Kenneth W. Mater
ATTORNEY 3,479,607

FREQUENCY DISCRIMINATOR WITH INJECTION-LOCKED OSCILLATOR

Clyde L. Ruthroff, Holmdel, N.J., assignor to Bell Telephone Laboratories, Incorporated, Murray Hill, N.J., a corporation of New York Filed Dec. 22, 1966, Ser. No. 603,847
Int. Cl. H03d 3/18
U.S. Cl. 329—124 4 Claims

ABSTRACT OF THE DISCLOSURE

A frequency discriminator in which an oscillator is injection locked to a received FM signal, the locked oscillator output being multiplied by the received signal, and filtered, to duplicate baseband.

BACKGROUND OF THE INVENTION

Field of the invention

This invention relates to frequency or phase demodulation and, more particularly, to locked oscillator demodulation circuits in which the oscillator circuit output is in phase quadrature with the input locking signal.

Description of the prior art

As disclosed, for example, in an article by G. S. Moschytz, entitled "Miniaturized RC Filters Using Phase-Locked Loop," Bell System Technical Journal, May-June, 1965, pages 823–870, a phase-locked loop oscillator is an advantageous arrangement for demodulating a received frequency-modulated (FM) signal and thus for reconstructing at the receiver the original modulating baseband signal.

The basic phase-locked loop consists of a phase detector with two input voltages, an input signal and the output of a voltage-controlled oscillator which is operating close in frequency to the input signal. The output of the phase detector provides an error signal which is proportional to the phase difference between the two voltages when they are approximately in phase quadrature. This signal is passed through a shaping network to the voltage-controlled oscillator. The error signal corrects the frequency of the oscillator to bring it into phase lock with the input signal. Since the oscillator is forced to follow the input frequency exactly, and because it is driven by the error signal at the output of the phase detector, it follows that the error signal is a reproduction of the frequency modulation. Hence, the phase-locked loop is a discriminator and demodulates the input frequency-modulated signal.

Such an arrangement is suitable for applications in which the baseband frequency range is small. When, however, the baseband frequency range is greater than approximatey one megaHertz, the time delay introduced by the loop becomes large, and the modulating signal cannot be reconstructed with high fidelity.

Summary

In accordance with the present invention, the frequency limitation imposed by the prior art phase-locked loop arrangement is overcome in a frequency discrimination circuit comprising an injection-locked oscillator and a mixer. Since the input FM signal is applied directly to the oscillator as an injection locking signal, no loop delay is encountered. More specifically, the invention comprises an injection oscillator locked to an incoming signal which is simultaneously applied to a mixing circuit to which the oscillator output is also applied. The output of the mixer, a measure of the difference between input signal and locked oscillator signal, is a reconstruction of the original baseband modulating signal.

In a specific microwave frequency embodiment of the invention, the FM signal is applied simultaneously to one arm of a four-branch hydrid and to one port of a circulator. The signal applied to the circulator proceeds to the next adjacent port which is connected to a diode oscillator having a natural resonance frequency corresponding to the input carrier frequency. The oscillator is a single port device whose output proceeds back to and through the circulator and is applied to the arm of the four-branch hybrid opposite that to which the input signal is applied. The remaining two arms of the hydrid, out of which the combined signal is transmitted, are terminated in a balanced diode-resistor combination across which the reconstructed baseband signal appears.

While the specific embodiment to be described as illustrative of the principles of the invention operates in the microwave frequency range, the invention is by no means limited to this frequency range. Lower frequency lumped circuit arrangements, as well as higher frequency millimeter wave and optical arrangements, can be devised without departing from the scope of the invention.

A more complete understanding of the principles of the present invention can be obtained from consideration of the following description, taken in conjunction with the accompanying drawings:

DETAILED DESCRIPTION

Figure 1:
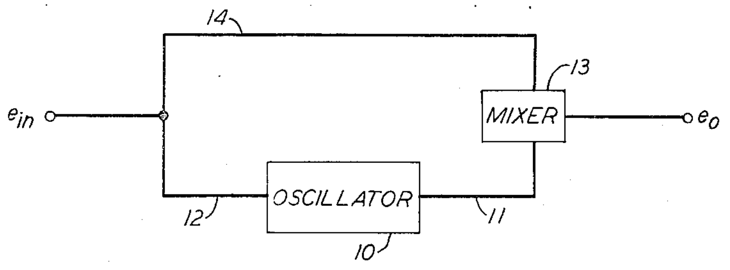
FIG. 1 is a diagrammatic representation of a generalized FM discriminator illustrating the principles of the invention.

FIG. 1 is a circuit representation of an injection-locked oscillator-mixer circuit which is helpful in understanding the principles of the invention. Simply stated, an input signal in the form of a typical frequency-modulated signal, $$e_{in}=\cos\,[\omega_0 t+\theta(t)]$$

where $\omega_0$ is the carrier frequency and $\theta(t)$ is the phase modulation, is applied along path 12 to oscillator 10. Constant amplitude factors have been omitted for simplicity. The oscillator 10 has a free running frequency equal to the carrier frequency of the input signal. When the input signal is applied to oscillator 10, frequency locking occurs, and the oscillator output on path 11 attempts to follow the modulation component present in the input. However, a discrete ninety-degree phase shift plus a smaller phase lag, $\varphi(t)$, is introduced between the output and input of the locked oscillator. The output signal from oscillator 10 can, therefore, be expressed as $$\sin\,[\omega_0 t+\theta(t)-\varphi(t)]$$

The original input signal and the locked oscillator output are applied simultaneously to mixer 13 over paths 14, 11, respectively. Path lengths are adjusted to preserve the ninety-degree phase shift at the carrier frequency between the two input voltages. Mixer 13 is most advantageously a simple multiplication component and, in accordance with trigonometric identities, the output $e_0$ from the mixer 13, which acts simultaneously as a low pass filter to eliminate terms of order $\omega_0$, can be simply expressed as $-\sin\,\varphi(t)$. This term represents the difference in phase between the output and the input of the locked oscillator and is directly proportional to the actual frequency deviations from the carrier frequency present in the signal $e_{in}$. Thus, the simple circuit of FIG. 1 is a frequency discriminator in which the output $e_0$ is a reconstruction of the baseband modulation signal used to produce the frequency-modulated input signal $e_{in}$. No conventional slope circuit is employed, and the inherent time delay of the phase-locked loop of the prior art is eliminated. The frequency limitation to maximum baseband frequency ranges of one megaHertz is accordingly no longer applicable, and capacity of frequency ranges up to 100 megaHertz can be expected.

Figure 2:
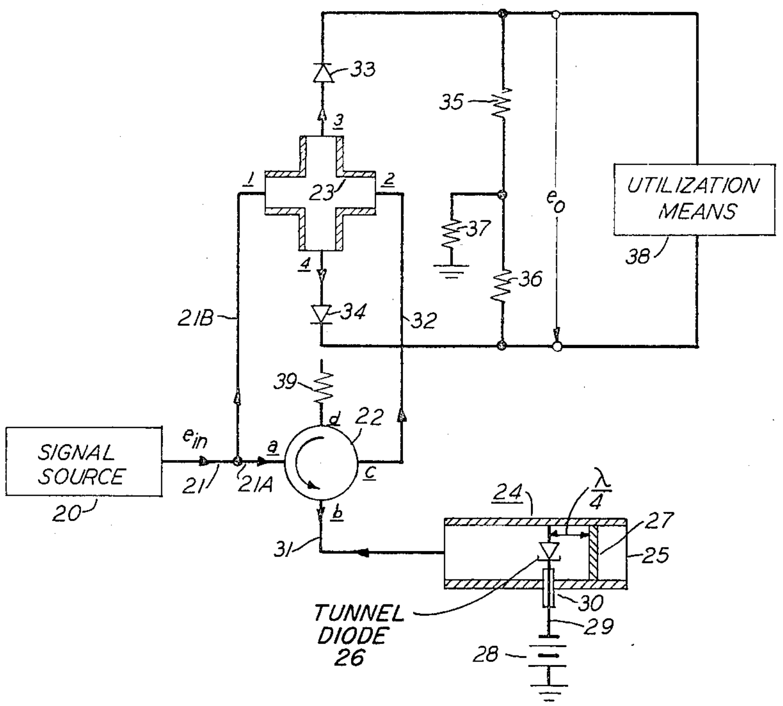
FIG. 2 is a semischematic arrangement of a microwave frequency discriminator embodiment in accordance with these principles.

FIG. 2 is a microwave frequency embodiment illustrating the principles of the invention. In FIG. 2, a signal source 20, which can, for example, be a transmitter or the first stage of the receiver in a communication system, supplies a frequency-modulated signal $e_{in}$ along waveguide path 21. Path 21 divides into paths 21A and 21B, the former of which leads to port *a* of a circulator 22 and the latter to branch 1 of four-branch hybrid 23. The power division advantageously is adjusted so that substantially equal powers will be made available to the mixing circuit.

The concept of a multiport wave energy circulator is well known in the microwave art, the accepted symbology being a circle, containing an arrow, having a plurality of radial spokes indicating ports. In FIG. 2, a four-port circulator is depicted in which waves applied at port *a* are transmitted in circular fashion to port *b*, application at *b* leads to *c*, application at *c*, to *d*, and at *d*, to *a*. Thus, each port is coupled around the circle to only one other port for a given port of application. Accordingly, when energy is applied to any given port of exit, the energy is coupled to a different port from that which would produce a signal at the excited port. The particular arrangement of FIG. 2 includes a resistive termination 39 at port *d*.

The input signal applied to port *a* of circulator 22 thus proceeds to port *b* and is incident via path 31 on diode oscillator 24 which illustratively is of the so-called tunnel diode type. This oscillator comprises a waveguide section 25 loaded with a diode 26, such as, for example, a germanium tunnel diode designated TD–252A by General Electric Corporation spaced one-quarter wave of the carrier frequency of the input signal from source 20 from shorting plate 27 and electrically biased to a negative resistance region from source 28 via lead 29 which extends through capacitive coupling means 30. The bias means 28 and the shorting plate 27 are adjusted to produce a free running frequency for oscillator 24 equal to the carrier frequency, typically of the order of 10 gigaHertz for the described arrangement. When the modulated signal is supplied from port *b* of circulator 22, oscillator 24 locks to it, and attempts to follow the frequency excursions of the modulated carrier about its carrier frequency. As explained with reference to FIG. 1, however, the phase of the locked oscillator does not precisely follow the input, and a phase difference term, proportional to the instantaneous frequency deviation of the modulated carrier from its center frequency, is generated. The oscillator output proceeds back along path 31 to port *b* of circulator 22, through which it passes to emerge at port *c* along path 32 leading to branch 2 of hybird 23.

The electrical characteristics of four-branch microwave hybrids are well known. Essentially a symmetrical device, a hybrid comprises two pairs of conjugate branches. A branch at which no energy appears when a given branch is energized is the conjugate of the given branch. In hybrid 23, branches 1 and 2 are conjugate, as are branches 3 and 4.

It will be recalled that the original FM signal is applied along path 21B to branch 1 of the hybrid and that the locked oscillator output, containing the input frequency components plus a component proportional to the error, or phase difference, between input and output of the locked oscillator, is simultaneously applied to branch 2 of the hybrid. The output signals from branches 3 and 4 appear across diodes 33, 34, respectively, which are nonlinear devices and which act as multiplication means to produce the desired mixing of the incident signals which are in quadrature. The outputs from the diodes are applied to a typical resistance network comprising resistors 35, 36, and 37. As explained with reference to FIG. 1, the output $e_0$ developed across resistors 35 and 36 is a reconstruction of the original baseband modulating signal and is available for further manipulation by utilizing means 38.

I claim:

1. In combination:

an oscillator whose free running frequency is substantially equal to the carrier frequency of a frequency-modulated input signal to be applied thereto;

means for coupling a first component of said frequency-modulated input signal to said oscillator to injection-lock said oscillator;

a signal mixer;

means coupling a second component of said input signal to said mixer;

means for coupling the injection-locked output signal from said oscillator to said mixer in time quadrature with the second component of said input signal; and means for extracting from said mixer the modulating signal components of said input signal.

2. In combination:

a frequency modulated signal source of carrier frequency $\omega_0$;

a multiple port circulator;

a mixing circuit;

an output utilization means;

means for applying a first signal component from said source to a first port of said circulator and for applying a second signal component from said source to said mixing circuit;

an oscillator having a free running frequency $\omega_0$ connected to a second port of said circulator;

said oscillator comprising a single port device producing an injection-locked output signal in phase quadrature with the input signal coupled thereto;

said injection-locked output signal being coupled back to the second port of said circulator;

means for applying the output signal from a third port of said circulator to said mixing circuit in time quadrature with the second signal component applied to said mixer; and means for applying the output from said mixer circuit to said utilization means.

3. The combination according to claim 1 wherein said mixer comprises a hybrid junction having first and second pairs of conjugate ports;

wherein said second signal component and the output from said third circulator port are coupled, respectively, to a different one of said first pair of ports; and wherein each port of said second pair of ports is coupled to an output network including a nonlinear circuit component.

4. Apparatus according to claim 1 in which said oscillator comprises a single port negative resistance oscillator.

References Cited

UNITED STATES PATENTS

| | | | |
|---|---|---|---|
| 2,883,533 | 4/1959 | Ruthroff | 329—116 |
| 3,201,757 | 8/1965 | Himmel | 325—416 X |
| 3,217,262 | 11/1965 | Battail et al. | 329—110 |
| 3,324,400 | 6/1967 | Battail et al. | 329—145 X |
| 3,369,233 | 2/1968 | Burnsweig | 325—433 X |
| 3,209,282 | 9/1965 | Schnitzler. | |

ALFRED L. BRODY, Primary Examiner

U.S. Cl. X.R.

307—232, 322; 325—419, 346, 474; 329—145, 116, 122; 331—107